(12) United States Patent
Katano et al.

(10) Patent No.: US 8,815,463 B2
(45) Date of Patent: Aug. 26, 2014

(54) FUEL CELL SYSTEM AND ITS CONTROL METHOD

(75) Inventors: Koji Katano, Toyota (JP); Norio Yamagishi, Aichi (JP); Akihisa Hotta, Ichinomiya (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 886 days.

(21) Appl. No.: 12/374,520

(22) PCT Filed: Jul. 6, 2007

(86) PCT No.: PCT/JP2007/063932
§ 371 (c)(1),
(2), (4) Date: Jan. 21, 2009

(87) PCT Pub. No.: WO2008/013065
PCT Pub. Date: Jan. 31, 2008

(65) Prior Publication Data
US 2009/0269630 A1    Oct. 29, 2009

(30) Foreign Application Priority Data

Jul. 26, 2006    (JP) ................................ 2006-203411

(51) Int. Cl.
*H01M 8/02* (2006.01)
*H01M 8/04* (2006.01)
*H01M 8/24* (2006.01)

(52) U.S. Cl.
CPC ...... *H01M 8/04007* (2013.01); *H01M 8/04335* (2013.01); *Y02E 60/50* (2013.01); *H01M 8/0435* (2013.01); *H01M 8/04955* (2013.01); *H01M 8/04223* (2013.01); *H01M 8/04783* (2013.01); *H01M 8/04753* (2013.01); *H01M 8/04343* (2013.01); *H01M 8/04104* (2013.01); *H01M 8/04365* (2013.01); *H01M 8/04328* (2013.01)
USPC ........... 429/446; 429/429; 429/463; 429/469; 429/508; 429/514

(58) Field of Classification Search
USPC ............ 429/17, 429, 446, 463, 469, 508, 514
See application file for complete search history.

(56) References Cited

U.S. PATENT DOCUMENTS

2005/0142408 A1 * 6/2005 Breault ........................... 429/25
2005/0158597 A1 * 7/2005 Saitou ............................. 429/22

(Continued)

FOREIGN PATENT DOCUMENTS

DE         103 13 437 A1    7/2004
DE    10 2005 047 972 A1    4/2006

(Continued)

OTHER PUBLICATIONS

Hishinuma et al., Machine translation of JP 09115532 A, May 1997.*

(Continued)

*Primary Examiner* — Sean P Cullen
(74) *Attorney, Agent, or Firm* — Kenyon & Kenyon LLP

(57) ABSTRACT

Deterioration of an electrolyte and a sealing member is suppressed taking account of the durable temperature characteristics thereof, while enhancing the starting performance of a fuel cell. For this realization, in a system comprising a gas piping system for supplying a reactant gas to a fuel cell, and a gas supply controller for altering the supply state of the reactant gas in response to a power generation request, a gas supply quantity is altered in accordance with the temperature of the fuel cell. Preferably, the gas supply quantity is altered in accordance with the durable temperature characteristics of a passage member forming a gas passage of the reactant gas. Furthermore, the differential pressure of the gas supply state between the anode side and the cathode side of the fuel cell is preferably taken into account and the differential pressure between both poles is suppressed by altering the gas supply quantity on the cathode side as the case may be.

9 Claims, 6 Drawing Sheets

(56) References Cited

U.S. PATENT DOCUMENTS

| | | |
|---|---|---|
| 2005/0208358 A1* | 9/2005 | Nishimura et al. ............ 429/34 |
| 2007/0048571 A1* | 3/2007 | Sasaki et al. .................. 429/25 |

FOREIGN PATENT DOCUMENTS

| | | | |
|---|---|---|---|
| JP | 09115532 A | * | 5/1997 |
| JP | 10-083824 A | | 3/1998 |
| JP | 2001-250576 A | | 9/2001 |
| JP | 2002-246051 A | | 8/2002 |
| JP | 2004-139984 A | | 5/2004 |
| JP | 2005-235584 A | | 9/2005 |
| JP | 2006-004904 A | | 1/2006 |
| JP | 2006-024390 A | | 1/2006 |
| JP | 2006-099988 A | | 4/2006 |

OTHER PUBLICATIONS

Igarashi et al., Machine translation of JP 2006099988 A, Apr. 2006.*
Translation of German Office Action dated Feb. 1, 2011 of DE 11 2007 001 741.4-45.

* cited by examiner

FUEL CELL SYSTEM AND ITS CONTROL METHOD

This is a 371 national phase application of PCT/JP2007/063932 filed 6 Jul. 2007, which claims priority to Japanese Patent Application No. 2006-203411 filed 26 Jul. 2006, the contents of which are incorporated herein by reference.

BACKGROUND OF THE INVENTION

1. Field of the Invention

The present invention relates to a fuel cell system and its control method. More particularly, it relates to the improvement of a technology for supplying and discharging various reactant gases to and from a fuel cell.

2. Description of Related Art

In general, a fuel cell (e.g., a polymer electrolyte fuel cell) is constituted by laminating a plurality of cells, each of the cells including an electrolyte held between separators. Moreover, a fuel cell system is constituted of, in addition to such a fuel cell, a piping system for supplying and discharging a reactant gas (a fuel gas or an oxidizing gas) to and from the fuel cell, an electric power system which charges and discharges electric power, a control system which generally controls the whole system and the like.

As the fuel cell system including such a fuel cell, for example, a system or the like is known in which a fuel gas (hydrogen gas) supply system is provided with a variable regulator, so that the set pressure of the fuel gas can be adjusted and controlled (e.g., see Patent Document 1).

[Patent Document 1] Japanese Patent Application Laid-Open No. 2004-139984

SUMMARY OF THE INVENTION

However, a reactant gas is supplied or gas pressure is increased, while durability against temperatures in sealing members of a fuel cell and various valves, an electrolyte and the like is not taken into account, so that deterioration of these sealing members and the electrolyte might proceed.

To solve the problem, an object of the present invention is to provide a fuel cell system in which deterioration of an electrolyte and a sealing member can be suppressed taking account of the durable temperature characteristics thereof, while enhancing the starting performance of a fuel cell.

To achieve such an object, the present inventor has performed various investigations. In general, the increasing of the pressure of a fuel gas (e.g., a hydrogen gas) piping system during the starting of the fuel cell is an important technology in that the fuel gas is quickly supplied to a fuel pole to promote reaction and easily enhance starting performance. On the other hand, however, there is an aspect that the strength of a member such as a sealing member made of a rubber or the like for use in the fuel cell or the electrolyte is not necessarily high. In this aspect, the present inventor has noted that the rubber, a resin, a membrane-like member or the like as a factor for determining the pressure-resistant performance of the fuel cell has high sensitivity to the temperature, and has the strength remarkably changing at a high temperature but that the temperature is not taken into account with respect to the resistance to the pressure. Then, the present inventor has further investigated the increasing of the pressure especially at a low temperature at which a starting performance is to be enhanced as compared with a conventional example, while newly taking account of the strength of the sealing member or the electrolyte having the strength lowered at the high temperature against the temperature, and the present inventor has eventually obtained an idea for solving such a problem.

The present invention has been developed based on such an idea, and there is provided a fuel cell system comprising: a gas piping system which supplies a reactant gas to a fuel cell; and a gas supply controller which alters the supply state of the reactant gas in response to a power generation request, wherein a gas supply quantity is altered in accordance with the temperature of the fuel cell.

Moreover, according to the present invention, there is provided a control method for controlling the supply quantity and the gas pressure of a reactant gas in a fuel cell system comprising: a gas piping system which supplies the reactant gas to a fuel cell; and a gas supply controller which alters the supply state of the reactant gas in response to a power generation request, wherein the gas supply quantity is altered in accordance with the temperature of the fuel cell.

In general, as to a member such as a rubber member (e.g., a sealing member made of a rubber) or an electrolyte, the strength tends to lower as the temperature rises (see FIG. 8). In consideration of such properties, the supply quantities of various reactant gases are altered in accordance with the temperature of the fuel cell in the present invention. That is, the temperature of the fuel cell during starting is a parameter, and a fuel gas pressure value (a pressure range) capable of enhancing the starting performance of the fuel cell at the temperature is obtained using the parameter. In this case, when the pressure of the fuel gas piping system is increased so as to fall in the obtained pressure range, the fuel gas can quickly be supplied to a fuel pole to promote reaction and enhance the starting performance. In addition, since the temperature of the fuel cell is the parameter, a burden on the rubber member or the electrolyte in the temperature situation during the starting can effectively be suppressed.

Here, the gas supply quantity is preferably altered in accordance with the durable temperature characteristics of a passage member forming a gas passage of the reactant gas. As to the member forming the gas passage, for example, the sealing member made of the rubber or the resin, or a member such as the electrolyte whose strength lowers in an environment at the high temperature, the gas supply quantity (and the gas pressure value) can be adjusted in accordance with the durable temperature characteristics to effectively suppress the burden and suppress the deterioration.

In this case, it is further preferable that the passage member is constituted of a plurality of different members and that a minimum value is selected from the temperature characteristics of the members. For example, when as the member forming the gas passage, the plurality of different members such as the sealing member and the electrolyte are used, the temperature characteristics of these members (the change of the strength against the temperature) might, needless to say, be different from one another in accordance with types. In this respect, when the temperature characteristic having the minimum value is selected to adjust the gas supply quantity as in the present invention, the burdens imposed on members such as the rubber member and the electrolyte can be suppressed to minimize the deterioration, while enhancing the starting performance of the fuel cell.

Moreover, the differential pressure of the gas supply state between the anode side and the cathode side of the fuel cell is preferably taken into account. When a gas is unilaterally supplied to a fuel gas side (the anode side) during the starting of the fuel cell, differential pressure between an anode and a cathode increases. The electrolyte might not resist the differential pressure or cross leak might be generated as the case may be. In this case, when, for example, an oxidizing gas is simultaneously supplied and the gas pressure value on the anode side is adjusted while suppressing the differential pressure, the starting performance of the fuel cell can be enhanced while suppressing such a problem.

Furthermore, the gas supply controller is, for example, a pressure adjustment device provided on the gas passage between a gas supply source and the fuel cell. The supply state (further the pressure of the reactant gas) of the reactant gas can be altered in response to the power generation request by various valves, a variable pressure regulator, an injector or the like.

In addition, it is preferable that in the control method of the fuel cell system, the gas supply quantity is altered in accordance with the durable temperature characteristics of the passage member forming the gas passage of the reactant gas. Furthermore, in this case, the minimum value is preferably selected from the temperature characteristics of the plurality of passage members different from one another.

Furthermore, it is preferable that when the fuel gas is supplied to the anode side of the fuel cell, the oxidizing gas is simultaneously supplied to the cathode side to shift upwards a pressure upper limit on the anode side.

DETAILED DESCRIPTION OF PREFERRED EMBODIMENT

Figure 1:
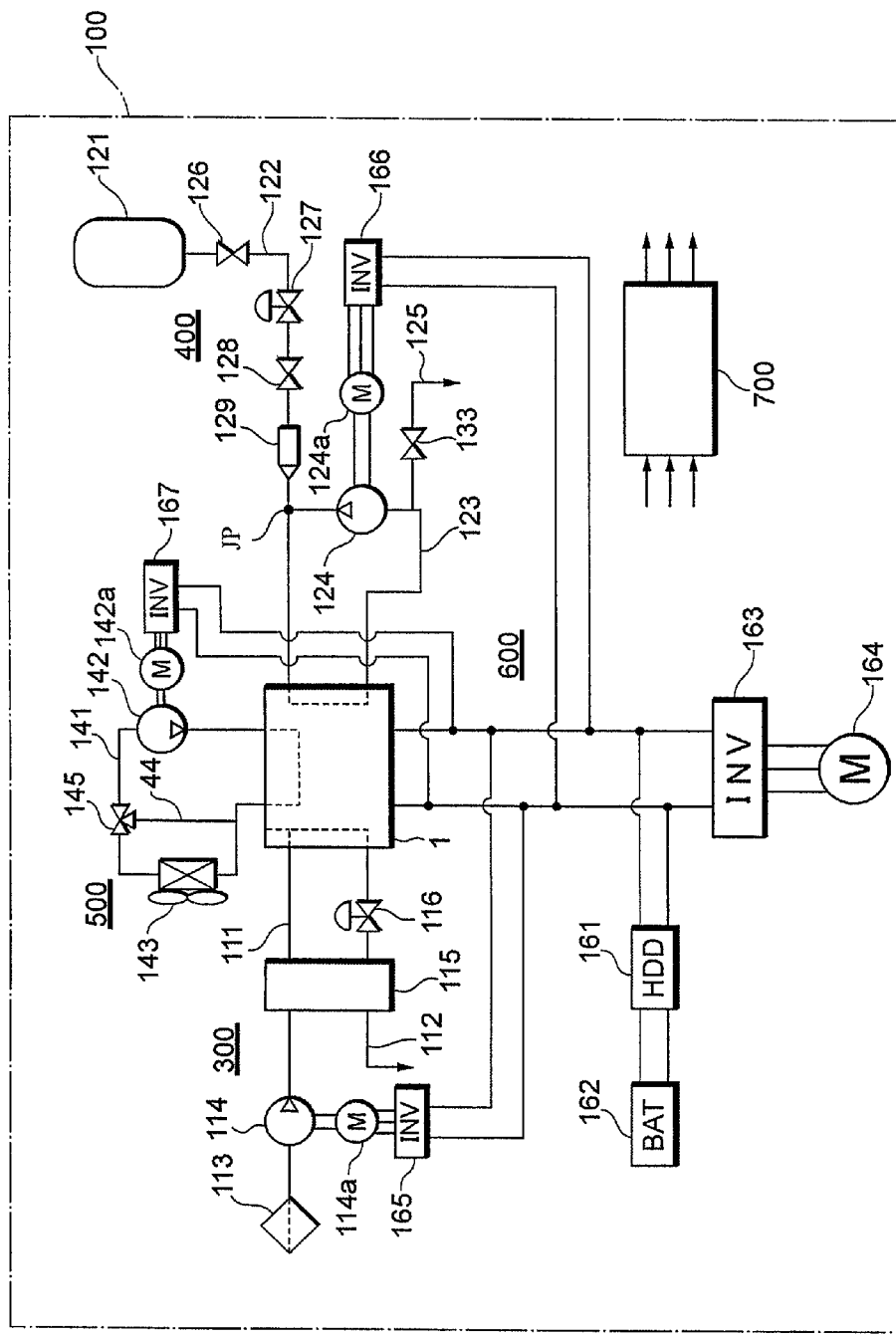
FIG. 1 is a diagram showing the constitution of a fuel cell system in the present embodiment.

A preferable embodiment of the present invention will hereinafter be described with reference to the drawings.

FIGS. 1 to 7 show the embodiment of a fuel cell system according to the present invention. A fuel cell system 100 according to the present invention includes gas piping systems 300, 400 for supplying a reactant gas to a fuel cell 1, a compressor 114, an adjustment valve 116, an original valve 126, and an injector 129 for altering the supply state of the reactant gas in response to a power generation request. A gas supply quantity is altered in accordance with the temperature of the fuel cell 1, whereby deterioration of a member made of a rubber, a resin or the like (e.g., a membrane-electrode assembly, a sealing member or the like) is suppressed while enhancing the starting performance of the fuel cell 1.

In the following description, first the whole constitution of the fuel cell system 100 and the constitution of a cell 2 constituting the fuel cell 1 will be described. Afterward, there will be described a constitution in which the deterioration of the member made of the rubber, the resin or the like is suppressed while enhancing the starting performance of the fuel cell 1.

FIG. 1 shows the schematic constitution of the fuel cell system 100 in the present embodiment. As shown in the drawing, the fuel cell system 100 includes the fuel cell 1, the oxidizing gas piping system 300 which supplies air (oxygen) as an oxidizing gas to the fuel cell 1, the fuel gas piping system 400 which supplies hydrogen as a fuel gas to the fuel cell 1, a refrigerant piping system 500 which supplies a refrigerant to the fuel cell 1 to cool the fuel cell 1, a power system 600 which charges or discharges the electric power of the system and a control unit 700 which generally controls the whole system.

The fuel cell 1 is constituted of, for example, a polymer electrolyte fuel cell, and has a stack structure in which a large number of cells (unit cells) 2 are laminated. Each of the cells 2 has an air pole on one surface of an electrolyte constituted of an ion exchange membrane, has a fuel pole on the other surface thereof, and further has a pair of separators 20 so as to sandwich the air pole and the fuel pole from both sides. The fuel gas is supplied to a fuel gas passage of one of the separators 20, and the oxidizing gas is supplied to an oxidizing gas passage of the other separator 20. When the gases are supplied in this manner, the fuel cell 1 generates electric power.

The oxidizing gas piping system 300 has an oxidizing gas supply path 111 through which the oxidizing gas to be supplied to the fuel cell 1 flows, and a discharge path 112 through which an oxidizing off gas discharged from the fuel cell 1 flows. The oxidizing gas supply path 111 is provided with a compressor 114 which takes the oxidizing gas via a filter 113, and a humidifier 115 which humidifies the oxidizing gas fed under pressure by the compressor 114. The oxidizing off gas flowing through the discharge path 112 passes through a back pressure adjustment valve 116 for use in water content exchange in the humidifier 115, and then the gas is finally discharged as an exhaust gas to the atmosphere outside the system. The compressor 114 is driven by a motor 114a to take the oxidizing gas from the atmosphere.

The fuel gas piping system 400 has a hydrogen supply source 121; a hydrogen gas supply path 122 through which a hydrogen gas to be supplied from the hydrogen supply source 121 to the fuel cell 1 flows; a circulation path 123 which returns a hydrogen off gas (a fuel off gas) discharged from the fuel cell 1 to a joining part JP of the supply path 122; a pump 124 which feeds the hydrogen off gas under pressure from the circulation path 123 to the hydrogen gas supply path 122; and a discharge path 125 branched and connected to the circulation path 123.

The hydrogen supply source 121 is constituted of, for example, a high-pressure tank, a hydrogen occluded alloy or the like so that, for example, 35 MPa or 70 MPa of hydrogen gas can be stored. When an original valve 126 of the hydrogen supply source 121 is opened, the hydrogen gas flows out to the hydrogen gas supply path 122. The hydrogen gas has pressure finally reduced into, for example, about 200 kPa by a pressure reduction valve such as a regulator valve 127, and is supplied to the fuel cell 1.

A blocking valve 128 and an injector 129 are provided on the upstream side of the joining part JP of the hydrogen gas supply path 122. The circulation system of the hydrogen gas is constituted by connecting a downstream-side passage of the joining part JP of the hydrogen gas supply path 122, a fuel gas passage formed in the separator of the fuel cell 1, and the circulation path 123 in this order. The hydrogen pump 124 is driven by a motor 124a to circulate and supply the hydrogen gas from the circulation system to the fuel cell 1.

The injector 129 is an electromagnetic driving type opening/closing valve in which a valve body is directly driven by an electromagnetic driving force in a predetermined driving period to be detached from a valve seat, whereby a gas flow rate and gas pressure can be adjusted. For example, the injector 129 of the present embodiment includes a valve seat having a jet hole which jets the hydrogen gas or the like, a nozzle body which guides the hydrogen gas or the like to the jet hole, and a valve body which is received and held so as to be movable with respect to this nozzle body in an axial direction (a gas flow direction) and which opens or closes the jet hole. The valve body of the injector 129 is driven by, for example, a solenoid, and a pulse like excitation current to be supplied to this solenoid cam be turned on or off to switch the open area of the jet hole in two stages or multistage.

The discharge path 125 is provided with a purge valve 133 as a blocking valve. The purge valve 133 is appropriately opened during the operation of the fuel cell system 100 to discharge impurities in the hydrogen off gas to a hydrogen diluter (not shown) together with the hydrogen off gas. When the purge valve 133 is opened, the concentration of the impurities in the hydrogen off gas of the circulation path 123 decreases, and the concentration of hydrogen in the hydrogen off gas to be circulated and supplied increases.

The refrigerant piping system 500 has a refrigerant circulation passage 141 which communicates with a cooling passage in the fuel cell 1; a cooling pump 142 provided in the refrigerant circulation passage 141; a radiator 143 which cools the refrigerant to be discharged from the fuel cell 1; a bypass passage 144 which bypasses the radiator 143; and a three-way valve (changeover valve) 145 which sets the passing of coolant through the radiator 143 and the bypass passage 144. The cooling pump 142 is driven by a motor 142a to circulate and supply the refrigerant from the refrigerant circulation passage 141 to the fuel cell 1.

The power system 600 includes a high-pressure DC/DC converter 161, a battery 162, a traction inverter 163, a traction motor 164 and various auxiliary device inverters 165, 166 and 167. The high-pressure DC/DC converter 161 is a direct-current voltage converter, and has a function of adjusting a direct-current voltage input from the battery 162 to output the voltage to a traction inverter 163 side and a function of adjusting a direct-current voltage input from the fuel cell 1 or the traction motor 164 to output the voltage to the battery 162. These functions of the high-pressure DC/DC converter 161 realize the charging/discharging of the battery 162. Moreover, the high-pressure DC/DC converter 161 controls the output voltage of the fuel cell 1.

In the battery 162, battery cells are laminated to obtain a constant high voltage as a terminal voltage, and a battery computer (not shown) performs control so that the excessive power can be charged or the power can subsidiarily be supplied. The traction inverter 163 converts a direct current into a three-phase alternate current to supply the current to the traction motor 164. The traction motor 164 is, for example, a three-phase alternate-current motor, and constitutes, for example, a vehicle main power source to be mounted on the fuel cell system 100.

The auxiliary device inverters 165, 166 and 167 are electric motor control devices which control the driving of the corresponding motors 114a, 124a and 142a, respectively. The auxiliary device inverters 165, 166 and 167 convert direct currents into three-phase alternate currents to supply the currents to the motors 114a, 124a and 142a, respectively. The auxiliary device inverters 165, 166 and 167 are, for example, PWM inverters of a pulse width modulation system, and convert the direct-current voltage output from the fuel cell 1 or the battery 162 into a three-phase alternate-current voltage in accordance with a control command from the control unit 700, to control rotation torques to be generated by the motors 114a, 124a and 142a.

The control unit 700 is constituted as a micro computer including therein a CPU, an ROM and an RAM. The CPU executes desired computation in accordance with a control program to perform various types of processing and control, for example, thawing control of the pump 124 described later. The ROM stores the control program and control data to be processed by the CPU. The RAM is used as any type of operation region mainly for control processing. The control unit 700 inputs detection signals of various types of pressure, temperature and outside air temperature sensors for use in the oxidizing gas piping system 300, the fuel gas piping system 400, and the refrigerant piping system 500, to output control signals to constituting elements.

Figure 2:
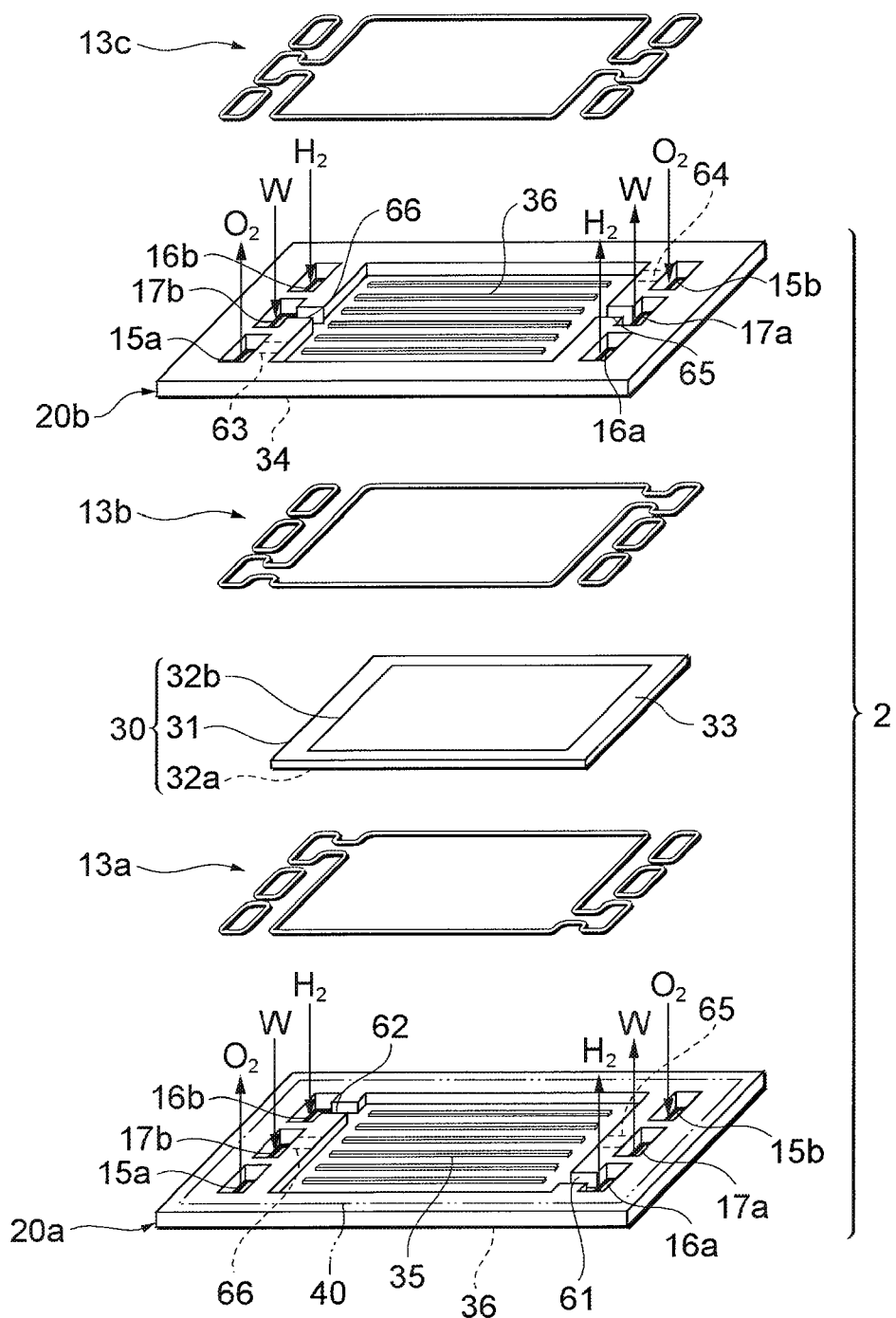
FIG. 2 is an exploded perspective view showing a cell of a cell laminate in an exploded manner.

Subsequently, FIG. 2 shows the schematic constitution of the cell 2 of the fuel cell 1 in the present embodiment. In the drawing, symbol W is water (coolant). The cells 2 constituted as shown in the drawing are successively laminated to constitute a cell laminate 3 (see FIG. 3). Moreover, for example, both ends of the cell laminate 3 formed in this manner are held between a pair of end plates 8, and a load is applied to the laminate in a laminating direction in a state in which a tension plate 9 is arranged so as to connect these end plates 8 to each other, thereby fastening the laminate.

It is to be noted that the fuel cell 1 constituted of the cells 2 and the like in this manner can be used as, for example, a car-mounted power generation system for a fuel cell hybrid vehicle (FCHV), but this is not restrictive, and the fuel cell can be used as a power generation system to be mounted on any type of mobile body (e.g., a ship, an airplane or the like) or a self-propelled body such as a robot, or a stationary power generation system.

The cell 2 is constituted of a membrane-electrode assembly (hereinafter referred to as the MEA) 30 as a typical example of an electrolyte, and a pair of separators 20 (denoted with symbols 20a, 20b in FIG. 2) between which the MEA 30 is held (see FIG. 2). The MEA 30 and the respective separators 20a, 20b are formed into an approximately rectangular plate-like shape. Furthermore, the MEA 30 is formed so that its outer shape is smaller than that of the respective separators 20a, 20b.

The MEA 30 is constituted of a polymeric electrolyte membrane (hereinafter referred to also simply as the electrolyte membrane) 31 constituted of an ion exchange membrane of a polymeric material, and a pair of electrodes (an anode side diffusion electrode and a cathode side diffusion electrode) 32a, 32b which sandwich the electrolyte membrane 31 from both the surfaces thereof (see FIG. 2). The electrolyte membrane 31 is formed so as to be larger than the respective electrodes 32a, 32b. To this electrolyte membrane 31, the respective electrodes 32a, 32b are joined by, for example, hot pressing, a peripheral edge 33 of the electrolyte membrane being left.

The electrodes 32a, 32b which constitute the MEA 30 are made of, for example, a porous carbon material (a diffusion layer) on which a catalyst such as platinum attached to the surfaces of the electrodes is carried. To the one electrode (anode) 32a, a hydrogen gas as a fuel gas (a reactant gas) is supplied, and to the other electrode (cathode) 32b, an oxidizing gas (a reactant gas) such as air or an oxidizing agent is supplied. These two kinds of reactant gases electrochemically react in the MEA 30 to obtain the electromotive force of the cell 2.

The separators 20 (20a, 20b) are constituted of a gas-impermeable conductive material. Examples of the conductive material include carbon, conductive hard resins, and metals such as aluminum and stainless steel. In the present embodiment, the separators 20 (20a, 20b) are made of a base material of a plate-like metal, and are so-called metal separators. On the surfaces of the electrodes 32a, 32b of this base material, membranes having excellent corrosion resistance (e.g., membranes formed by gold plating) are preferably formed.

Moreover, on both the surfaces of the separators 20a, 20b, groove-like passages constituted of a plurality of recesses are formed. In a case where the separators 20a, 20b in the present embodiment are made of a base material of, for example, the plate-like metal, these passages can be formed by press molding. The thus formed groove-like passages constitute a gas passage 34 of the oxidizing gas, a gas passage 35 of a hydrogen gas, or a coolant passage 36. More specifically, on the inner surface of the separator 20a on the side of the electrode 32a, a plurality of hydrogen gas passages 35 are formed, and on the back surface (the outer surface) of the separator, the plurality of coolant passages 36 are formed (see FIG. 2). Similarly, on the inner surface of the separator 20b on the side of the electrode 32b, the plurality of oxidizing gas passages 34 are formed, and on the back surface (the outer surface) of the separator, the plurality of coolant passages 36 are formed (see FIG. 2). Furthermore, in the present embodiment, the coolant passages 36 of both the separators in the two adjacent cells 2, 2 are integrally configured to form passages having, for example, a rectangular section or a honeycomb-like section, when the outer surface of the separator 20a of the one cell 2 is joined to the outer surface of the separator 20b of the adjacent cell 2 (see FIG. 2).

Furthermore, as described above, the separators 20a, 20b have a reversed relation of a recess/projection shape for forming at least a fluid passage between the front surface and the back surface. More specifically, in the separator 20a, the back surface of the projection shape (the projection rib) forming the gas passage 35 of the hydrogen gas has the recess shape (the recess groove) forming the coolant passage 36, and the back surface of the recess shape (the recess groove) forming the gas passage 35 has the projection shape (the projection rib) forming the coolant passage 36. Furthermore, in the separator 20b, the back surface of the projection shape (the projection rib) forming the gas passage 34 of the oxidizing gas has the recess shape (the recess groove) forming the coolant passage 36, and the back surface of the recess shape (the recess groove) forming the gas passage 34 has the projection shape (the projection rib) forming the coolant passage 36.

Moreover, around the ends of the separators 20a, 20b in a longitudinal direction (in the vicinity of one end shown on the left side as one faces FIG. 2 according to the present embodiment), there are formed manifolds 15a on the inlet side of the oxidizing gas, manifolds 16b on the outlet side of the hydrogen gas and manifolds 17b on the outlet side of the coolant. For example, in the present embodiment, these manifolds 15a, 16b and 17b are formed of substantially rectangular or trapezoidal through holes provided in the respective separators 20a, 20b (see FIG. 2). Furthermore, the opposite ends of the separators 20a, 20b are provided with manifolds 15b on the outlet side of the oxidizing gas, manifolds 16a on the inlet side of the hydrogen gas and manifolds 17a on the inlet side of the coolant. In the present embodiment, these manifolds 15b, 16a and 17a are also formed of substantially rectangular or trapezoidal through holes (see FIG. 2).

Among the above manifolds, the inlet-side manifold 16a and the outlet-side manifold 16b for the hydrogen gas in the separator 20a communicate with the gas passages 35 of the hydrogen gas via an inlet-side communication passage 61 and an outlet-side communication passage 62 formed as groove-like passages in the separator 20a, respectively. Similarly, the inlet-side manifold 15a and the outlet-side manifold 15b for the oxidizing gas in the separator 20b communicate with the gas passages 34 of the oxidizing gas via an inlet-side communication passage 63 and an outlet-side communication passage 64 formed as groove-like passages in the separator 20b, respectively (see FIG. 2). Furthermore, the inlet-side manifolds 17a and the outlet-side manifolds 17b for the coolant in the respective separators 20a, 20b communicate with the coolant passages 36 via inlet-side communication passages 65 and outlet-side communication passages 66 formed as groove-like passages in the respective separators 20a, 20b, respectively. According to the above-mentioned constitution of the respective separators 20a, 20b, the oxidizing gas, the hydrogen gas and the coolant are fed to the cell 2. Here, a typical example will be described. When the cells 2 are laminated, for example, the hydrogen gas passes through the inlet-side communication passage 61 from the inlet-side manifold 16a of the separator 20a to flow into the gas passage 35, and is used for the power generation of the MEA 30. Afterward, the gas passes through the outlet-side communication passage 62, and is discharged to the outlet-side manifold 16b.

Each of a first sealing member 13a and a second sealing member 13b is formed of a plurality of members (e.g., four small rectangular frame members, and a large frame member forming the fluid passage) (see FIG. 2). The first sealing member 13a of them is provided between the MEA 30 and the separator 20a. More specifically, a part of the first sealing member is interposed between the peripheral edge 33 of the electrolyte membrane 31 and a portion of the separator 20a around the gas passage 35. Moreover, the second sealing member 13b is provided between the MEA 30 and the separator 20b. More specifically, a part of the second sealing member is interposed between the peripheral edge 33 of the electrolyte membrane 31 and a portion of the separator 20b around the gas passage 34.

Furthermore, a third sealing member 13c formed of a plurality of members (e.g., four small rectangular frame members, and a large frame member forming the fluid passage) is provided between the separator 20b and the separator 20a of the adjacent cells 2, 2 (see FIG. 2). This third sealing member 13c is a member interposed between a portion of the separator 20b around the coolant passage 36 and a portion of the separator 20a around the coolant passage 36 to seal between these portions.

It is to be noted that as the first to third sealing members 13a to 13c, an elastic member (a gasket) which physically comes in contact with the adjacent member to seal a fluid, an adhesive to be bonded to the adjacent member due to chemical coupling and the like may be used. For example, in the present embodiment, as the sealing members 13a to 13c, physically sealing members due to elasticity are employed, but the sealing member due to the chemical coupling, for example, the above adhesive may be employed instead.

A resin frame 40 is a member (hereinafter referred to also as the resin frame) made of, for example, a resin and held together with the MEA 30 between the separators 20a and 20b. For example, in the present embodiment, the resin frame 40 is interposed between the separators 20a and 20b, so that at least a part of the MEA 30, for example, a portion thereof along the peripheral edge 33 is held from the front side and the backside by the resin frame 40. The resin frame 40 provided in this manner exerts a function of supporting a fastening force as a spacer between the separators 20 (20a and 20b), and a function of a reinforcing member which reinforces the rigidity of the separator 20 (20a, 20b).

Figure 3:
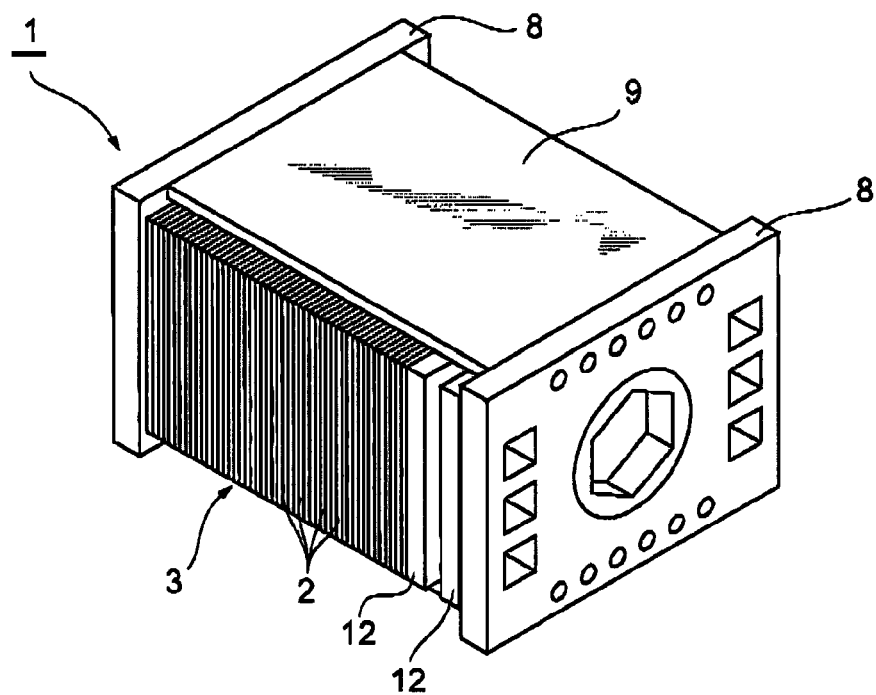
FIG. 3 is a perspective view schematically showing a structure example of a fuel cell stack.

The constitution of the fuel cell 1 will briefly be described as follows (see FIG. 3, etc.). The fuel cell 1 in the present embodiment has the cell laminate 3 in which a plurality of unit cells 2 are laminated, and includes a structure in which collecting plates 6 provided with output terminals 5, insulating plates 7 and the end plates 8 are successively arranged on the outer sides of the unit cells 2, 2 positioned at both the ends of the cell laminate 3 (see FIG. 3). The cell laminate 3 is bound to a laminated state by the tension plate 9. The tension plate 9 is provided so as to bridge both the end plates 8, 8. For example, a pair of tension plates are arranged so as to face both sides of the cell laminate 3. It is to be noted that reference numerals 12 are a pair of pressure plate which hold a plurality of elastic members (not shown) in the laminated direction of the cells 2.

Subsequently, in the fuel cell system 100 of the present embodiment, there will be described a constitution for suppressing the deterioration of the member made of a rubber, a resin or the like while enhancing the starting performance of the fuel cell 1 (or the fuel cell system 100) (see FIG. 4, etc.).

From a viewpoint that during the starting of the fuel cell 1 (the fuel cell system 100), the hydrogen gas (the fuel gas) be quickly supplied to the fuel pole (the anode) to promote the reaction and enhance the starting performance, it is preferable to increase the gas pressure in the fuel gas piping system 400 as described above. However, members such as the sealing members (e.g., the first to third sealing members 13a to 13c) for use in the fuel cell 1 and the MEA 30 do not necessarily have excellent temperature characteristics. To solve the problem, in the present embodiment, the deterioration of the member made of the rubber, the resin or the like is suppressed while enhancing the starting performance (see FIG. 4, etc.).

That is, in the present embodiment, the system includes a gas supply controller capable of altering the supply state of the reactant gas in response to a power generation request, so that the gas supply quantity is altered in accordance with the temperature of the fuel cell 1. That is, the temperature of the fuel cell 1 during the starting is a parameter, and a fuel gas pressure value (a pressure range) capable of enhancing the starting performance of the fuel cell 1 at the temperature is obtained using this parameter. When the pressure value (the pressure range) is obtained, the pressure of the fuel gas piping system 400 is increased so as to fall in the obtained pressure range, and the fuel gas (the hydrogen gas) is quickly supplied to the fuel pole of the fuel cell 1 to promote the reaction and enhance the starting performance.

The above respect will hereinafter specifically be described with reference to the drawing (see FIG. 4, etc.). That is, the upper limit (the pressurizing allowable value) of the pressure at each temperature is obtained based on the temperature characteristics (the change of the strength against the temperature) of, for example, the sealing members 13a to 13c (or the MEA 30) (see a solid line in FIG. 4). Furthermore, the lower limit (the pressurizing lower limit value) of the pressure capable of enhancing the starting performance of the fuel cell 1 is obtained (see a one-dot chain line in FIG. 4). As a result, the upper limit and the lower limit of the pressure value at each temperature are determined. Therefore, the gas supply quantity is controlled or altered so that the pressure value falls in the range.

Figure 4:
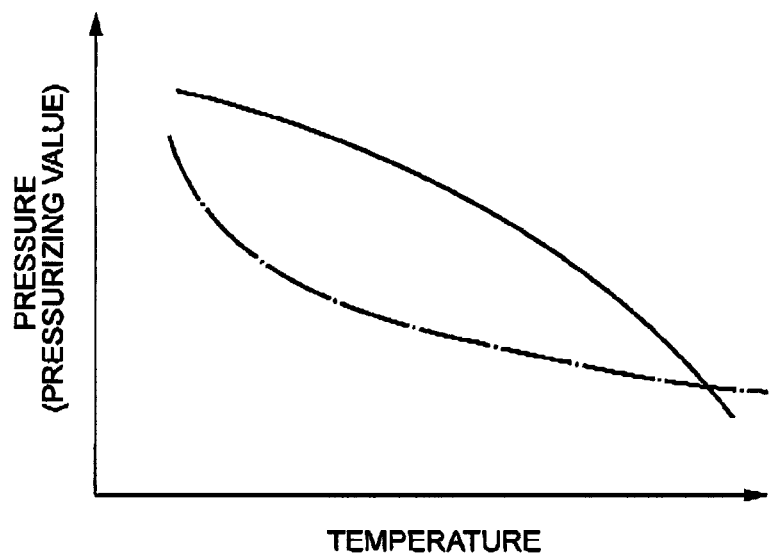
FIG. 4 is a graph schematically showing a pressurizing allowable value (a solid line) as one of the temperature characteristics of a sealing member and the like, and a pressurizing lower limit value (a one-dot chain line) capable of enhancing the starting performance of a fuel cell.
Figure 5:
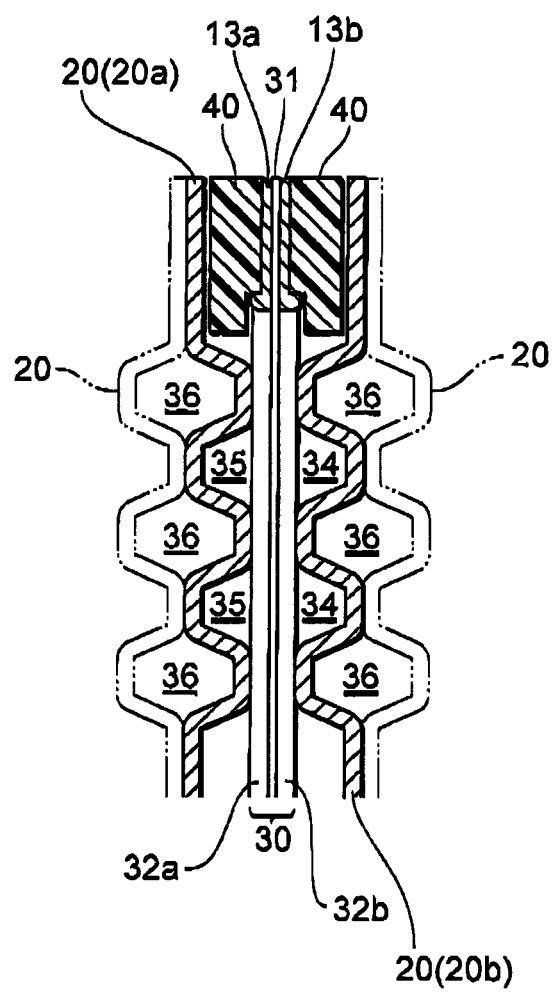
FIG. 5 is a sectional view showing one example of the structure of a portion of the cell laminate laminated on a separator.

Additionally, in this case, it is preferable to control the pressure value so that the value comes close to a lower value in the obtained pressure range, that is, the pressurizing lower limit value (see the one-dot chain line in FIG. 4). In consequence, influence on the sealing members 13a to 13c and the MEA 30 can further be suppressed while enhancing the starting performance of the fuel cell 1, which is preferable from the viewpoint that the deterioration be suppressed.

It is to be noted that the temperature of the fuel cell 1 is not limited to that of any specific portion. For example, the water temperature (the outlet water temperature) of an outlet portion from the fuel cell 1 in the refrigerant piping system 500, the water temperature (the inlet water temperature) of an inlet portion for feeding the refrigerant to the fuel cell 1 in the refrigerant piping system 500, the temperature (the outlet hydrogen off gas temperature) of the outlet portion from the fuel cell 1 in the circulation path 123 of the hydrogen off gas, the temperature (the outlet oxidizing off gas temperature) of the outlet portion from the fuel cell 1 in the discharge path 112 through which the oxidizing off gas flows or the like may be used as the temperature of the fuel cell 1 (see FIG. 1, etc.).

Moreover, the gas supply controller which alters the supply states (including the pressures of various reactant gases) of the reactant gases (the fuel gas, the oxidizing gas) in response to the gas power generation request may be constituted of various devices. For example, the gas supply controller may be constituted of various devices provided in the hydrogen gas supply path (the gas passage) 122 between the hydrogen supply source (the gas supply source) 121 and the fuel cell 1. In the fuel cell system 100 of the present embodiment, the gas supply controller may be constituted of the original valve 126, the regulator valve 127, the blocking valve 128, the injector 129 and the like (see FIG. 1, etc.).

In addition, to adjust the pressure values of the reactant gases (the hydrogen gas and the oxidizing gas), the supply quantities of these reactant gases are preferably altered in accordance with the durable temperature characteristics of the passage members constituting the gas passages of the reactant gases. As to the members forming the gas passages, for example, the sealing member made of the rubber, the resin or the like and the MEA 30, the strength lowers in the environment at the high temperature. Therefore, the gas supply quantity (and the gas pressure value) can be adjusted in accordance with the durable temperature characteristics to effectively suppress the burden. It is to be noted that the gas passages mentioned herein include not only the hydrogen gas supply path (the gas passage) 122 and the oxidizing gas supply path 111 but also a region for causing chemical reaction in the reactant gas, a region formed of the sealing member for preventing the leakage of the reactant gas and the like. Therefore, the above-mentioned sealing members 13a to 13c, the MEA 30 and the like are the passage members forming the gas passages, respectively.

Moreover, in a case where a plurality of different members are disposed as the passage members as in the present embodiment, it is preferable that a minimum value is selected from the temperature characteristics of the members to alter the supply quantity of the hydrogen gas (the reactant gas). When the plurality of passage members are disposed, the temperature characteristics (the strength change with respect to the temperature) of these members are, needless to say, different from one another in accordance with the type. Therefore, in this case, when the minimum value is selected from the plurality of temperature characteristics to adjust the gas supply quantity, the burden imposed on the passage member made of the rubber, the resin or the like can be minimized. A typical example will be described. In a case where, for example, the MEA 30, the sealing members 13$a$, 13$b$ made of the rubber, the resin frame 40 and the like are disposed as the passage members, the minimum value is selected from the temperature characteristics of these members to set a gas pressuring value which is slightly larger than the minimum value (see FIG. 5, etc.).

Furthermore, it is preferable to take account of the differential pressure in the gas supply state between the fuel pole (anode) side and the oxygen pole (cathode) side of the fuel cell 1. When the only fuel gas is unilaterally supplied during the starting of the fuel cell 1, the differential pressure between an anode and a cathode increases. The MEA 30 might not resist the differential pressure or cross leak might be generated as the case may be. In this case, the supply quantity of the fuel gas is altered taking account of the differential pressure with reference to both of the pressure (e.g., the gauge pressure) on the anode side and the pressure (e.g., the gauge pressure) on the cathode side, whereby the starting performance of the fuel cell 1 can be enhanced while avoiding the above-mentioned problem.

In addition, it is preferable that not only the fuel gas but also the oxidizing gas are simultaneously supplied and the gas pressure value on the anode side is adjusted while suppressing the differential pressure. For example, in a case where a pressure of 400 kPa is to be applied on the anode side but the MEA 30 only has a resistance to a pressure of 300 kPa, the oxidizing gas is supplied to the cathode side to set the gauge pressure to a pressure of 100 kPa corresponding to the differential pressure. In consequence, the anode-side pressure value can be increased to 400 kPa in such a range that the pressure resistance of the MEA 30 is not exceeded.

Figure 6:
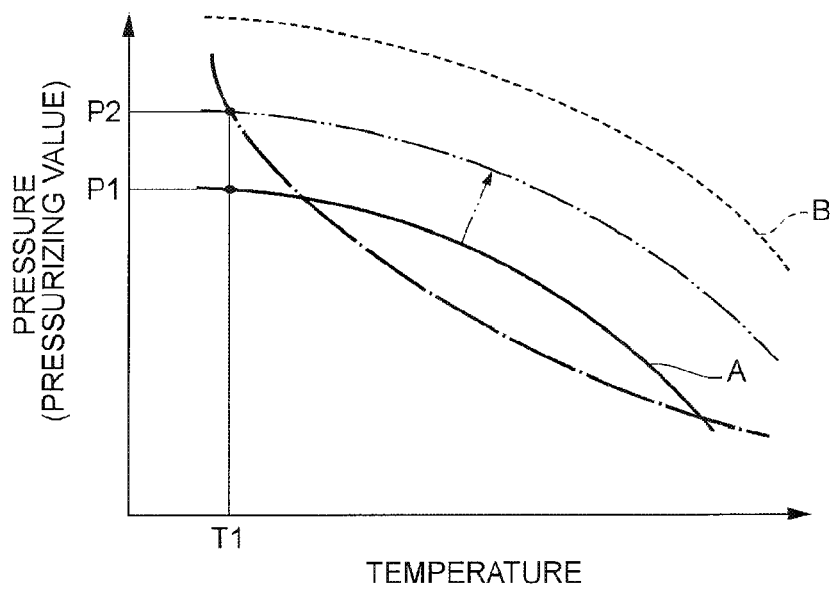
FIG. 6 is a graph for explaining that not only a fuel gas but also an oxidizing gas are simultaneously supplied to adjust a gas pressure value on an anode side, while suppressing differential pressure, the graph showing a relation between the pressurizing allowable value (a solid line, a two-dot chain line, a broken line) as one of the temperature characteristics of the sealing member and the like, and the pressurizing lower limit value (a one-dot chain line) capable of enhancing the starting performance of the fuel cell.

This respect will hereinafter be described with reference to a graph (see FIG. 6). That is, for example, as shown in FIG. 6, in a case where the fuel cell 1 is started in an environment at a remarkably low temperature (temperature T1), even when the pressurizing is performed to a pressure upper limit (the pressurizing allowable value) P1, the pressure does not reach a pressure lower limit (the pressurizing lower limit value) P2 capable of enhancing the starting performance of the fuel cell 1. In this case, even the oxidizing gas is simultaneously supplied, and the gas pressure value on the anode side can be adjusted while suppressing the differential pressure between both the poles. Then, even while suppressing the differential pressure, the anode-side pressure upper limit (the pressurizing allowable value) shifts upwards. In other words, a result similar to that in a case where a line (a solid line A in the drawing) indicating the pressure upper limit (the pressurizing allowable value) shifts upwards is obtained (a two-dot chain line in the drawing). Therefore, when the supply quantity of the fuel gas is altered while adjusting the supply quantity of the oxidizing gas, the starting performance can be enhanced while avoiding damage on the MEA 30 or the generation of the cross leak (see FIG. 6). It is to be noted that a broken line B in FIG. 6 is a virtual line in a case where the pressure (the pressurizing value) of the oxidizing gas on the cathode side is maximized.

Figure 7:
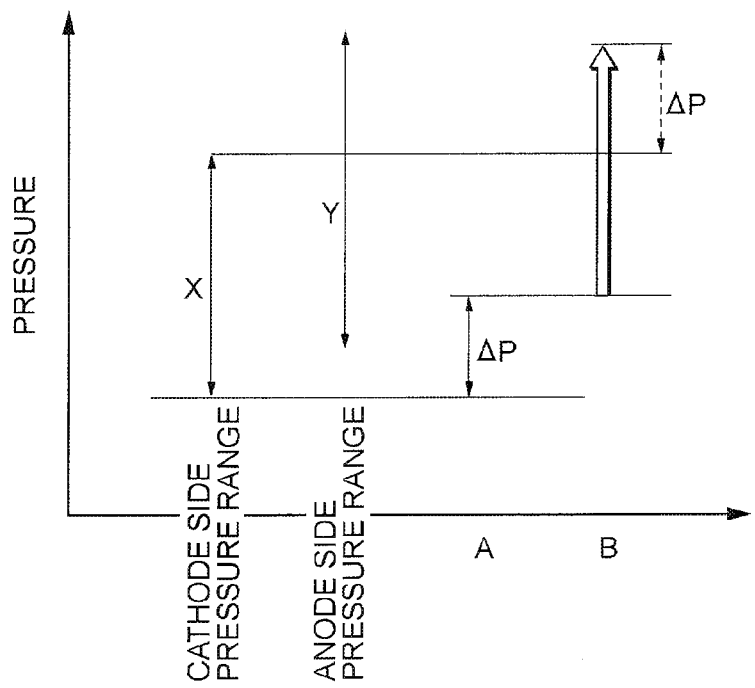
FIG. 7 is another graph for explaining that not only the fuel gas but also the oxidizing gas are simultaneously supplied to adjust the gas pressure value on the anode side, while suppressing the differential pressure.
Figure 8:
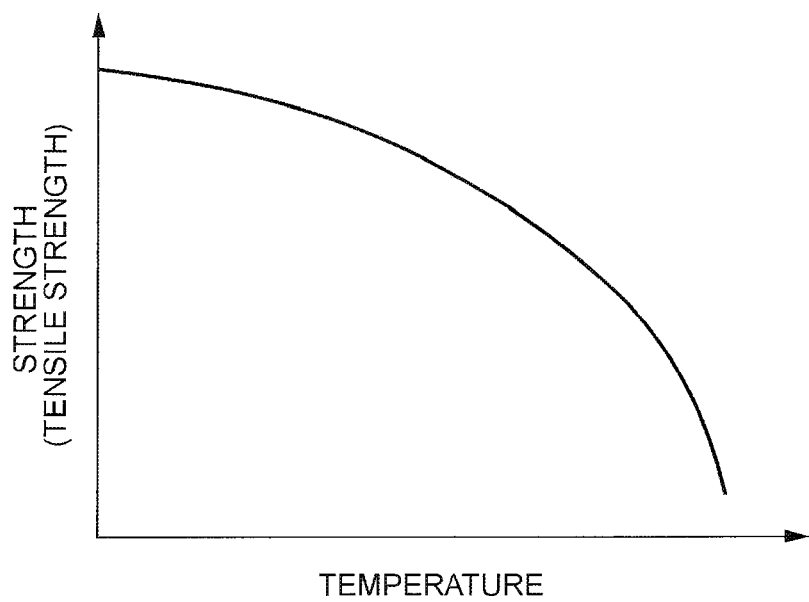
FIG. 8 is a graph schematically showing a relation between the strength of a rubber member or an electrolytic film and a temperature, in a case where the abscissa indicates the temperature and the ordinate indicates tensile strength.

Furthermore, the constitution will hereinafter be described with reference to another graph (see FIG. 7). That is, when a pressure range which can be employed on the cathode side by use of the compressor (the gas supply controller) 114 is X, and a pressure range which can be employed on the anode side by use of the regulator valve (the gas supply controller) 127 or the like is Y. Furthermore, when the pressure-resistant performance (withstanding pressure) of the MEA 30 is ΔP, the pressurizing value on the anode side cannot exceed the withstanding pressure ΔP (A in the drawing). However, in this case, when the gas is supplied even to the cathode side, the pressure upper limit (the pressurizing allowable value) on the anode side can be shifted upwards while suppressing the differential pressure. For example, when the cathode side is pressurized to a full value X in a cathode pressure range, as shown by B in the drawing, the withstanding pressure ΔP shifts upwards as much as the value X as it is, and the value of the pressure to be applied to the anode side increases as shown by a bold arrow (see FIG. 7).

As described above, in general, the strength of a member such as the rubber member (e.g., the sealing member made of the rubber) or the electrolyte in the fuel cell 1 tends to lower, as the temperature rises. However, in the fuel cell system 100 of the present embodiment, the supply quantities of various reactant gases are altered in accordance with the temperature of the fuel cell 1 during the starting, taking account of such properties. Therefore, while enhancing the starting performance of the fuel cell 1, the deterioration of these members can be suppressed. In addition, since the temperature of the fuel cell 1 is a parameter, the burden imposed on the rubber member or the like can effectively be suppressed even in any temperature situation during the starting.

It is to be noted that the above embodiment is one example of the preferable embodiment of the present invention, but this is not restrictive, and the present invention can variously be modified within the scope of the present invention when carried out. For example, in the present embodiment, time concerning the starting has not been described, but it is preferable to start the system in a short time in such a range that the starting performance can be enhanced. When the anode side is filled with nitrogen during restarting, the time is set to time (e.g., about 30 seconds) sufficient for replacing nitrogen with the fuel gas (the hydrogen gas), which is preferable from the viewpoint that the influence on each member be suppressed.

Industrial Applicability

According to the present invention, supply gas pressure is adjusted taking account of the durable temperature characteristics of members such as a sealing member and an electrolyte, so that the deterioration of these members can be suppressed while enhancing the starting performance of a fuel cell.

Therefore, the present invention can broadly be applied to a thus demanded fuel cell system and a control method of the system.

The invention claimed is:

1. A fuel cell system, comprising:
a gas piping system which supplies a reactant gas to a fuel cell;
a gas supply controller configured to alter a supply state of the reactant gas in response to a power generation request; and
a control unit programmed to control the gas supply controller to alter a gas supply quantity in accordance with a temperature of the fuel cell,
wherein the control unit is further programmed to obtain a pressurized allowable value based on the temperature of the fuel cell and durable temperature characteristics of a passage member forming a gas passage of the reactant gas, to control the gas supply controller, and to alter the gas supply quantity so that the gas pressure in the gas piping system is below the obtained pressurized allowable value.

2. The fuel cell system according to claim 1, wherein the passage member is constituted of a plurality of different members, and the control unit is further programmed to select a minimum value from durable temperature characteristics of the plurality of different members.

3. The fuel cell system according to claim 1, wherein the control unit is further programmed to control the gas supply controller to alter the gas supply quantity based on a differential pressure of a gas supply state between an anode side and a cathode side of the fuel cell.

4. The fuel cell system according to claim 1, wherein the gas supply controller is a pressure adjustment device provided on the gas passage between a gas supply source and the fuel cell.

5. The fuel cell system according to claim 1, wherein the higher the temperature of the fuel cell is the lower the pressurized allowable value.

6. A control method for controlling a gas supply quantity and a gas pressure of a reactant gas in a fuel cell system comprising: a gas piping system which supplies the reactant gas to a fuel cell; a gas supply controller with alters a supply state of the reactant gas in response to a power generation request; and a control unit programmed to control the gas supply controller to alter the gas supply quantity in accordance with a temperature of the fuel cell, comprising the steps of:

altering the gas supply quantity in accordance with the temperature of the fuel cell, altering the gas supply quantity in accordance with durable temperature characteristics of at least one passage member forming a gas passage of the reactant gas, and obtaining a pressurized allowable value based on the temperature of the fuel cell and the durable temperature characteristics of the at least one passage member to control the gas supply controller and to alter the gas supply quantity so that the gas pressure in the gas piping system is below the obtained pressurized allowable value with the control unit.

7. The control method of the fuel cell system according to claim 6, wherein the at least one passage member is a plurality of passage members, and wherein a minimum value is selected from the durable temperature characteristics of the plurality of passage members which are different from one another.

8. The control method of the fuel cell system according to claim 7, wherein when a fuel gas is supplied to an anode side of the fuel cell, an oxidizing gas is simultaneously supplied to a cathode side to shift upwards a pressure upper limit on the anode side.

9. The control method of the fuel cell system according to claim 6, wherein when a fuel gas is supplied to an anode side of the fuel cell, an oxidizing gas is simultaneously supplied to a cathode side to shift upwards a pressure upper limit on the anode side.

* * * * *